United States Patent
Davies

(10) Patent No.: US 10,295,029 B2
(45) Date of Patent: May 21, 2019

(54) MAGNETIC DAMPING SYSTEMS

(71) Applicant: GOODRICH ACTUATION SYSTEMS LIMITED, West Midlands (GB)

(72) Inventor: Stephen H Davies, Shrewsbury (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 0 days.

(21) Appl. No.: 14/844,728

(22) Filed: Sep. 3, 2015

(65) Prior Publication Data

US 2016/0069439 A1 Mar. 10, 2016

(30) Foreign Application Priority Data

Sep. 5, 2014 (EP) .................................. 14275186

(51) Int. Cl.
*F16F 15/03* (2006.01)
*F16H 25/24* (2006.01)
*F16H 1/28* (2006.01)
*F16H 25/20* (2006.01)

(52) U.S. Cl.
CPC ......... *F16H 25/2454* (2013.01); *F16F 15/03* (2013.01); *F16H 1/28* (2013.01); *F16H 25/2015* (2013.01); *F16F 2232/04* (2013.01)

(58) Field of Classification Search
CPC .......... F16F 9/532; F16F 9/53; F16H 25/2454
USPC ..................................................... 188/267.1
See application file for complete search history.

(56) References Cited

U.S. PATENT DOCUMENTS

| | | | | |
|---|---|---|---|---|
| 3,935,614 A | * | 2/1976 | Pannone | A62C 2/247 16/48.5 |
| 4,130,030 A | * | 12/1978 | Stratienko | F16D 21/06 192/48.91 |
| 4,616,737 A | * | 10/1986 | Orii | F16F 7/06 188/184 |
| 4,979,261 A | * | 12/1990 | Lasier | E05F 3/04 16/62 |
| 5,048,151 A | * | 9/1991 | Orii | E05F 3/00 16/49 |
| 5,135,083 A | | 8/1992 | Hayashi | |

(Continued)

FOREIGN PATENT DOCUMENTS

EP 2527689 A2 11/2012

OTHER PUBLICATIONS

European Search Report for application No. EP14275186.6; dated Feb. 2015, 6 pages.

*Primary Examiner* — Thomas J Williams
*Assistant Examiner* — James K Hsiao
(74) *Attorney, Agent, or Firm* — Cantor Colburn LLP

(57) ABSTRACT

A rotary magnetic damper comprises a first, rotary damper element, a second, static damper element and a rotary input coupled to the rotary damper element. The coupling between the input and the rotary damper element is such that rotation of the rotary input causes the rotary damper element to progressively magnetically engage the static damper element whereby to progressively increase a damping force created by the damper. The rotary damper element may be a magnet or magnets mounted on a carrier which threadingly engages a screw driving element such that as the input rotates the carrier, it and the rotary damper element translate axially along the screw driving element towards the static damper element.

18 Claims, 4 Drawing Sheets

(56) References Cited

U.S. PATENT DOCUMENTS

| | | | | |
|---|---|---|---|---|
| 6,315,370 B1 * | 11/2001 | Feigel | ...................... | B60T 7/042 |
| | | | | 303/113.4 |
| 6,520,042 B2 * | 2/2003 | Jammer | ............... | B62D 5/0409 |
| | | | | 267/141 |
| 6,523,431 B2 * | 2/2003 | Ozsoylu | ............... | B62D 5/0409 |
| | | | | 74/388 PS |
| 8,225,458 B1 * | 7/2012 | Hoffberg | ................ | E05F 3/102 |
| | | | | 16/49 |

* cited by examiner

MAGNETIC DAMPING SYSTEMS

FOREIGN PRIORITY

This application claims priority to European Patent Application No. 14275186.6 filed Sep. 5, 2014, the entire contents of which is incorporated herein by reference.

TECHNICAL FIELD

The present disclosure relates to magnetic damping systems and in particular to rotary magnetic damping systems.

BACKGROUND

Rotary magnetic damping systems are used in a number of applications, for example in applying a braking force to an actuator, for example in an aircraft system.

A rotary magnetic damping system typically comprises first and second elements which rotate relative to each other. One of the elements is magnetic, and the other of an electrically conductive material. The relative rotation of the elements induces eddy currents in the electrically conductive material which in turn generates a magnetic field. This magnetic field opposes the field of the magnet, such that a braking force is generated on the movable element.

In aircraft systems there has been a movement to powering actuators for operating various components, such as flight control surfaces, undercarriage components, thrust reversers and so on, electrically rather than hydraulically. This saves weight, which is beneficial in aircraft. Situations may occur, however where if there is a disconnect or failure between the drive motor and the actuated element, external forces acting on the activated element, for example gravity or aerodynamic forces, may cause the surface and the attached actuator to run away. Systems must be employed to absorb the energy of such a runaway situation.

It would be desirable to provide a rotary magnetic damper which may address this situation.

SUMMARY

Disclosed herein is a rotary magnetic damper. The damper comprises first and second damper elements which are rotatable relative to each other. A rotary input is coupled to one or both of the damper elements. At least one of the damper elements is arranged such that under rotation of the input it moves such that it may progressively magnetically engage the other damper element to progressively increase a damping force created by the damper.

In such an arrangement, the progressive magnetic engagement of the damper elements will progressively increase the damping force created by the damper. Such a damper may find use in an actuator system as discussed above, and can have the advantage that under normal operating conditions, the degree of magnetic interaction between the elements is absent or low (as determined by the relative rotational speed or by the position of the actuator in its stroke), whereby normal operation of the actuator is unimpeded or relatively unimpeded by the damper. However, in the event of a runaway event the magnetic interaction increases to increase a damping force applied by the damper, thereby absorbing a portion of the energy of the actuator system and avoiding potential damage thereto. Typically, the increased magnetic interaction will be targeted at a portion of the actuator stroke approaching a hardstop for the actuator, and/or be produced as a result of the relatively higher runaway rotational speeds encountered in a runaway situation.

In one embodiment, the damper comprises a first, rotary damper element and a second, static (i.e. non rotary) damper element. The rotary input may be coupled to the rotary damping element such that the rotary damping element is moved relative to the static damping element.

One of the damper elements, for example the rotary damper element, may be mounted so as to translate towards and away from the other of the damper elements. Thus, for example, as the rotary damper element advances towards the static damper element the magnetic interaction and therefore the damping force created increases, and as the rotary damper element moves away from the static damper element the degree of magnetic interaction and the damping force decreases.

To achieve a translating movement, the movable, for example the rotary, damper element may be coupled to a screw driving element such as a threaded drive screw or a ball screw.

In embodiments, the rotary damper element is mounted to a splined output element of the rotary input so as to be translatable along the splined output element.

The rotary damper element may be mounted on a carrier, the carrier engaging the input element and the screw driving element.

In embodiments, the carrier may be cup-shaped, with the closed end of the carrier engaging the screw driving element.

The rotary input may include reduction gearing, for example planetary gearing, to reduce the rotational speed of the rotary damper element relative to the speed received by the input. This may be advantageous in certain embodiments as it may allow the axial length of the damper to be reduced.

In embodiments, the damper may be provided with planetary reduction gearing, the rotary member being coupled to the planetary carrier.

In embodiments, the damper may include a clutch which will prevent translational movement of the rotary damper element beyond a predetermined end position.

In one embodiment, using a drive screw element as discussed above, the drive screw element may be provided with a clutch, for example a ball detent clutch, such that in the event of the rotary damper element engaging a stop on the drive screw element, the rotary motion of the rotary damper element will be transmitted to the drive screw element which will then slip on its clutch.

In a damper with a planetary gearing system as discussed above, a clutch may be provided in the planetary gearing. For example, a clutch may be provided between a ring gear of the system and a housing of the damper.

The rotary damper element may comprise one or more magnetic elements arranged in a circumferential manner. The static damper element may comprise a ring of electrical conductive material into which the magnetic elements move.

The damper may be designed as an in-line replaceable unit or incorporated into an actuator.

As mentioned above, the damper may advantageously be incorporated in an actuator system.

From a further aspect, there also is disclosed herein an actuator system comprising a drive motor and an actuator coupled to the motor. A rotary magnetic damper as disclosed above is coupled to the actuator.

In such an arrangement, as an actuator may run away, the damping force created by the damper may progressively increase to absorb the energy created.

The actuator may be a screw actuator, for example a ball screw actuator, and may be linked to other actuators. In that event, a single damper may provide damping for multiple actuators.

The initial positioning of the rotary damper element relative to the static damper element may be chosen such that as the actuator accelerates from rest to an operative speed, the magnetic interaction between the rotary and static damper elements (and thus the damping force generated) is zero or low, with a damping force only generated over a predetermined proportion of the length of the actuator stroke.

BRIEF DESCRIPTION OF DRAWINGS

Some embodiments of the disclosure will now be described, by way of example only with reference to the accompanying drawings in which.

DETAILED DESCRIPTON

Figure 1:
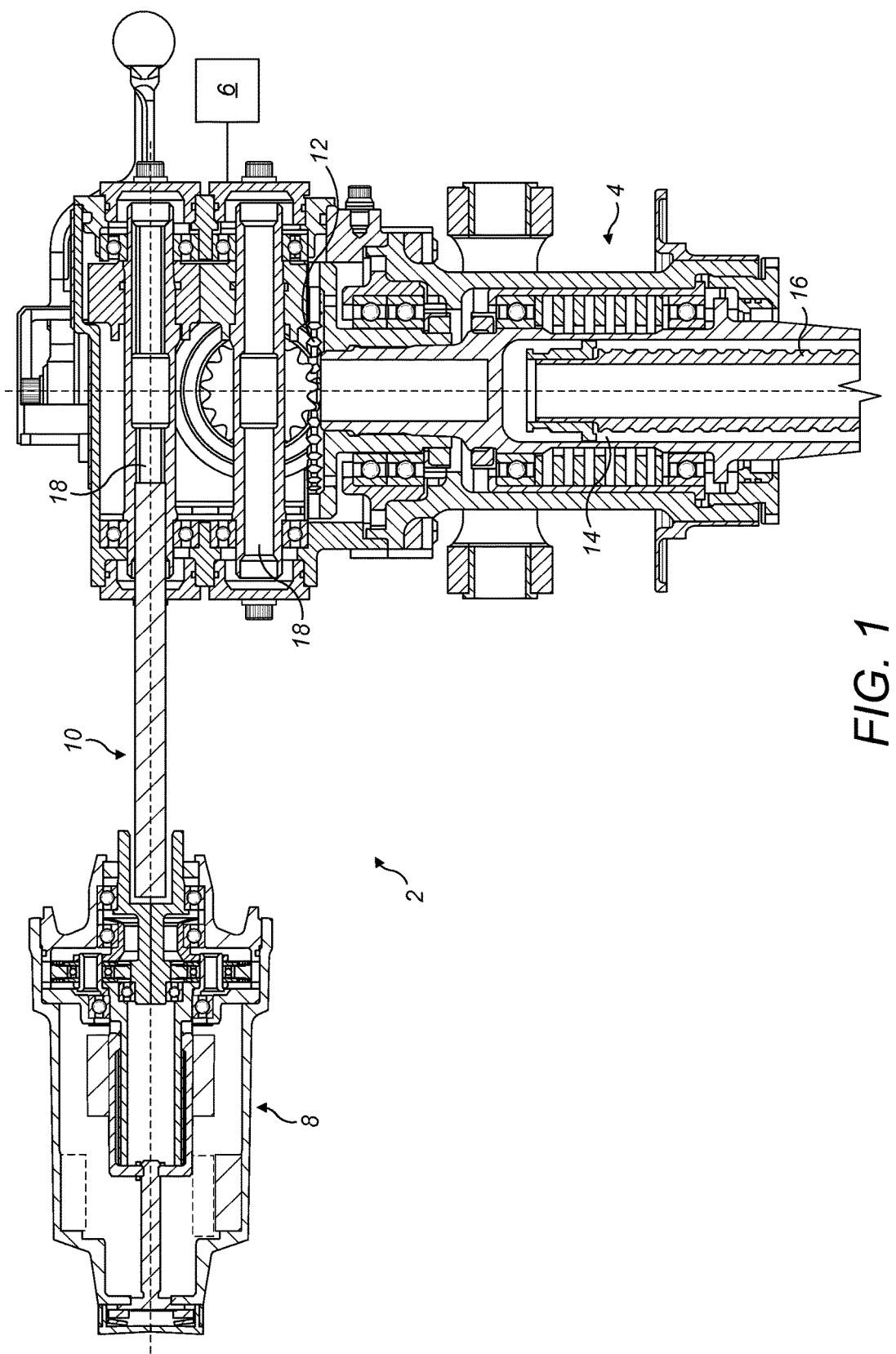
FIG. 1 shows an actuator system embodying a rotary magnetic damper.

With reference to FIG. 1, there is shown an actuator system 2. The actuator system 2 comprises an actuator 4, an electric drive motor 6 (illustrated schematically) and a rotary magnetic damper 8 coupled to the actuator 4 by a drive shaft 10. In this embodiment, the actuator 4 is a ballscrew actuator, in particular a ballscrew actuator for use in deploying an aircraft control surface. It will be understood however, that this is not limiting of the disclosure and that the actuator 4 may be for other applications, and of a different construction.

The rotary motion of the actuator 4 is transmitted to the rotary magnetic damper 8 via the drive shaft 10.

The electric drive motor 6 provides a rotary input to the actuator 4 through gearing 12, causing rotation of a ball nut 14 which in turn causes a linear movement of an actuator shaft 16.

The actuator 4 further comprises a pair of splined shafts 18 which are coupled to the gearing 12 such that rotation of the gearing 12 (either by the motor 6 or the actuator 4) will cause rotation of the splined shafts 18. Such shafts 18 may serve to provide an external drive from the actuator 4, for example to transmit the drive from the motor 16 to one or more additional actuators 4. Such drive arrangements are known in the art and need not therefore be described further herein.

In this embodiment, however, one of the splined shafts 18 receives the drive shaft 10, in this case a flexible drive shaft 10, which couples the actuator 4 to the rotary magnetic damper 8.

The rotary magnetic damper 8 comprises an input element 20 having a square socket 22, internal splines or other suitable means for coupling with the flexible drive shaft 10.

The input element 20 is supported in a housing 24 by bearings 26. The input element 20 drives planetary reduction gearing 28. The reduction gearing 28 comprises a sun gear 30, driven by a splined drive 32 on the input element 20, a ring gear 34 mounted statically in the housing 24 and a plurality of planetary gears 36. The planetary gears 36 are supported in a planetary carrier 38 which is supported for rotation in the housing 24 by bearings 40 and for rotation on the input element 20 by bearings 42. In fact, the input element 20 and the gearing 28 may be pre-assembled into a first part 42 of the housing 24, which is received within a bore 44 of a second part 46 of the housing 14.

The planetary carrier 38 is provided with an elongate extension shaft 48 having a plurality of splines 50 on its external surface.

A first rotary damper element 52 is supported on the extension shaft 48. The first damper element 52 comprises one or more permanent magnets 54 mounted on the external surface of a cup-shaped carrier element 56. The magnets 54 may be made from any suitable magnetic material, for example, samarium, neodymium and so on.

The cup-shaped carrier 56 is provided with internal splines 58 whereby the rotation of the extension shaft 48 is transmitted to the carrier 56.

It will be seen that the magnet(s) 54 are mounted at one end 60 of the carrier 56, in particular at the end 60 nearest the input element 20.

The opposite, closed end 62 of the cup-shaped carrier 56 is provided with an internally threaded opening 64 which engages with a screw thread 66 provided on the external surface of a screw driving element 68. Respective claw elements 70, 72 are also provided on the end 62 of the carrier 56, one claw 70 facing outwardly and one claw 72 facing inwardly. The purpose of the claws 70, 72 will be described further below.

The screw driving element 68 has a head portion 74 which is supported in housing part 46 by a bearing 76 provided in an opening 78 in the housing part 46. The head portion 74 mounts a series of spring loaded detent balls 80, (typically between 2 and 7 balls 80) received within respective bores 82 housing biasing springs 84. The balls 80 engage with shallow splines 86 in a cover part 88 of the housing part 46. The spring force exerted by the springs 84 is such that in normal use the screw driving element 68 will remain static relative to the housing 24, but if a torque which exceeds a predetermined amount is applied to the screw driving element 68, the balls 80 will ride up on the splines 86 against the biasing force of the springs 84 and be pushed back into the bores 82, allowing the screw driving element 68 to rotate relative to the housing 24 on bearing 76.

The head portion 74 of the driving screw element 68 also includes a claw 90 for engagement with the claw 70 provided on the exterior facing surface of the carrier end 56. The distal end 92 of the screw driving element 58 also carries a claw 94 for engagement with the claw 72 on the interior facing surface of the carrier end 56.

The claws 70, 72, 90, 94 and the spring loaded detent balls 80 together form a clutch mechanism whose operation will be described further below.

Finally, a second, static damper element 96 is fixedly mounted in the housing 24. In this embodiment the static damper element 96 is received on a shoulder 98 formed at one end of the second housing part 46. The static damper element 96 may be retained in the housing part 46 by a force fit, by fasteners or any suitable means.

The static damper element 96 is, in this embodiment a ring of an electrically conductive material such as aluminium or copper although other conductive metals may be used.

Operation of the damper 8 will now be described.

Figure 2:
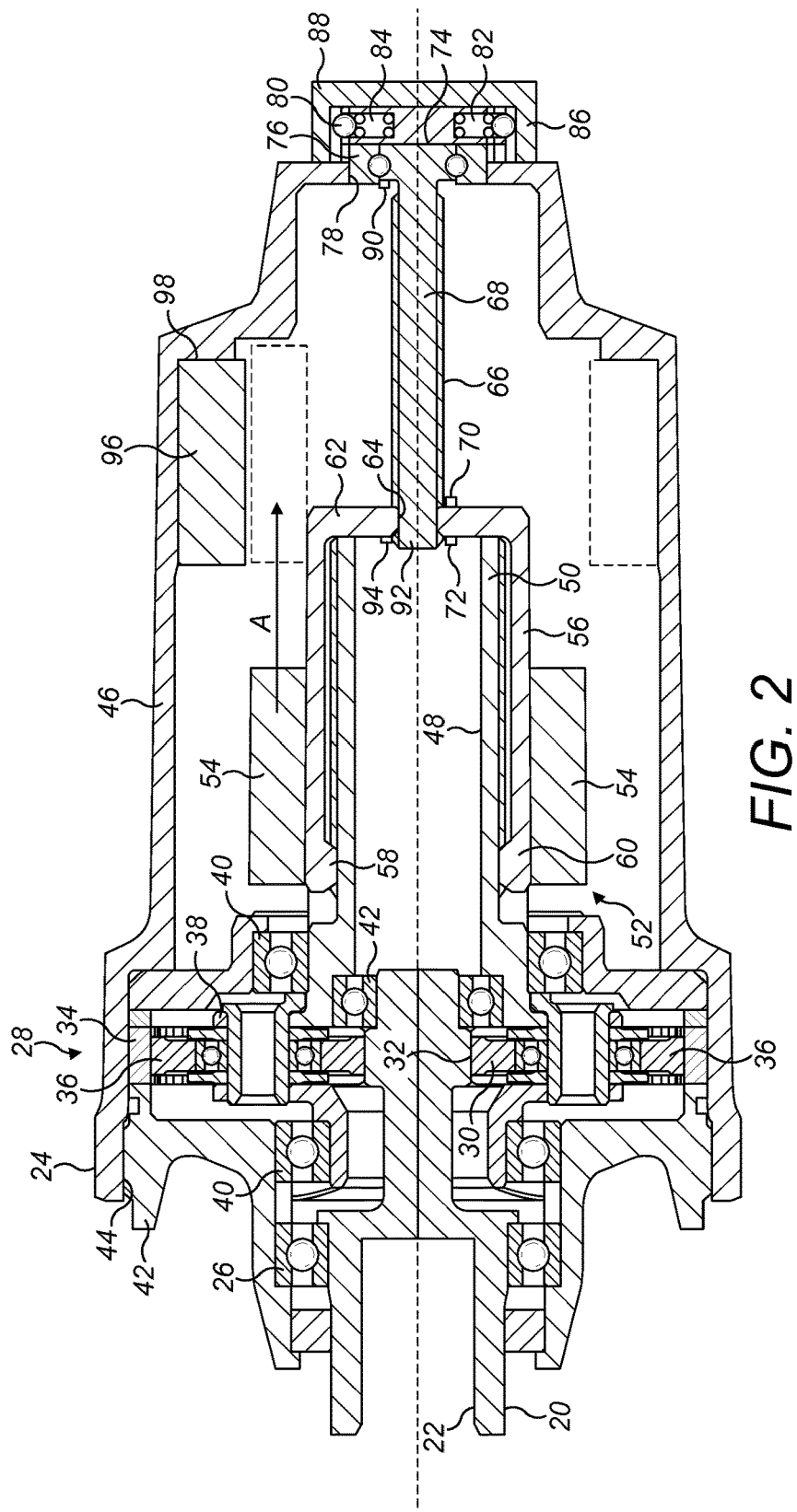
FIG. 2 shows the rotary magnetic damper of FIG. 1 in a first operative configuration.

The position of the damper shown in FIG. 2 corresponds to a non-operative or starting position of the actuator 4. When drive is supplied to the actuator 4 from the motor 6, rotational movement of the actuator 4 is transmitted to the damper 8 via the flexible shaft 10.

In this configuration, it will be seen that the rotary magnet(s) 54 are axially offset relative to the static damper element 96. Accordingly, there is little, if any, magnetic interaction between the elements 54, 96. Thus, as the magnets 54 rotate, little or no damping force is produced in the damper 8. Thus as the actuator 4 is accelerated by the drive motor 6, there is little or no damping force applied to the actuator 4 or drive motor 6.

Rotation of the drive shaft 10 is transmitted to the carrier 56 for the rotary damper element(s) 54 via the planetary gearing 28. In this particular example, the reduction ratio of the gearing 28 is about 6.9:1, although any suitable gearing ratio may be chosen. Reduction gearing may be desirable in that it will allow for a reduction in the axial length of the damper 8, as the rotary damper element(s) 54 will not move as far along the screw driving element 68 for a given number of rotations of the input element 20. The particular ratio may be chosen to suit any particular application. In practice, the damping force produced will depend on the rotational speed of the rotary damper element(s) 54, so an appropriate trade-off between space saving and damping force will have to be made in any particular application.

As the carrier 56 rotates, its threaded engagement with the screw driving element 68, which is static relative to the housing 24, will cause the carrier 56, together with the rotary damper element(s) 54 to translate along the screw driving element 68 in the direction of the arrow A. This axial or translational movement is accommodated by the splines 50, 58 provided on the planetary carrier extension 48 and the carrier 56 respectively.

It will be appreciated that as the carrier 56 moves in the direction of arrow A, the rotary damper element(s) 54 move closer to the static damper element 92. As it does so, the magnetic interaction between the elements increases, such that the eddy current (magnetic) damping generated by the damper 8 also increases.

The point at which the magnetic interaction commences, and the rate at which it increases, can be chosen to meet any particular operational requirement.

The increase in the degree of interaction and therefore the damping force will be generally linear in the arrangement shown, where the rotary and static elements are essentially cylindrical in configuration. Other rates of increase could theoretically be achieved with other shapes of element, for example frusto conical elements.

Figure 3:
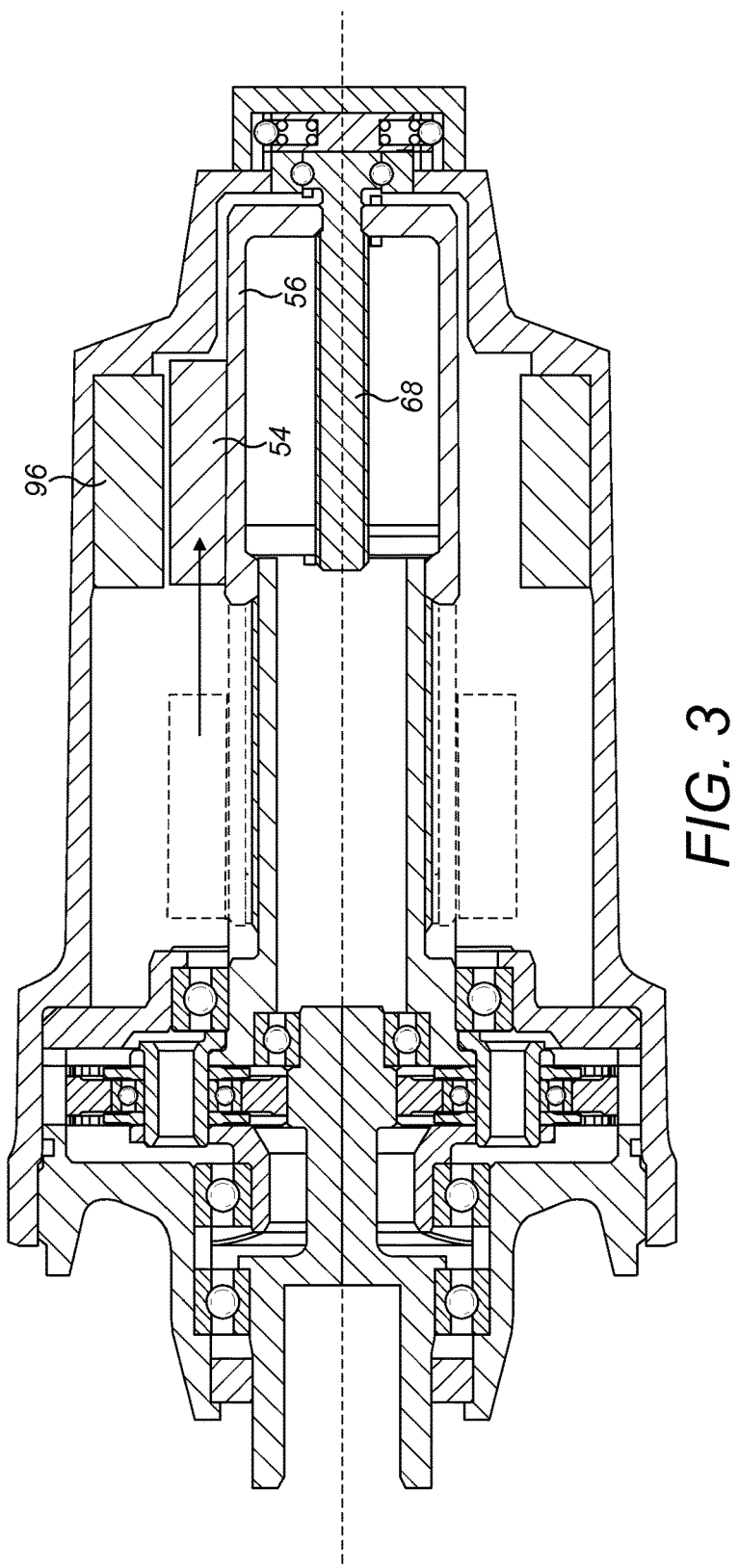
FIG. 3 shows the rotary magnetic damper of FIGS. 1 and 2 in a second operative configuration.

In the position shown in FIG. 3, which corresponds to an end position of the actuator 4, the elements 54, 96 overlap substantially completely, meaning that a relatively high damping force will be produced as the element(s) 54 rotate within the static damper element 96.

During normal operation of the actuator, the motor 6 will accelerate the actuator 4 to full speed. The starting position of the damper 8 shown in FIG. 2 is chosen such that over this initial period of acceleration, there is little or no damping force created in the damper 8, i.e. the rotary damping element(s) 54 does not move so far axially as to significantly interact with the static damper element 96. This means that no damping force is transmitted back to the motor 6, which is desirable since were a damping force applied, the motor 6 would have to be larger, which is undesirable. Motor loads tend to be highest during acceleration.

Thus in the initial acceleration phase for the actuator 4, little or no damping is applied by the damper 8. However, as the actuator 4 continues to move, the rotary damper element(s) 54 will begin to interact to a greater degree with the static damper element 96, thereby generating or increasing a damping force on the rotary damping element(s) 54, which force is then transmitted back to the actuator 4 and motor 6 via the drive shaft 10. The motor 6 is, however, better able to accommodate such damping loads as the actuator 4 is already into its stroke, meaning that the forces required to continue moving the actuator 4 are not as great as during initial acceleration.

Should, for any reason, the drive motor 6 fail (for example if its drive electronics failed), during operation and the actuator 4 continue to deploy under external forces, e.g. aerodynamic forces or its own weight, the energy associated with this 'runaway' can be absorbed by the damper 8. Specifically, as the actuator 4 moves towards the end of its stroke, the damping force generated in the damper 8 will increase progressively, whereby damage to the actuator 4 may be avoided.

In this embodiment, there is effectively no or little damping effect over about 80-85% of the actuator/damper stroke, with a damping effect only being generated in the last 15-20% of the stroke. However, these figures may be varied according to the particular application.

The progressive characteristic of the damping force can be tuned to the particular application by the starting position of the rotary damper element(s) 54 and the pitch of the screw thread 66 provided on the driving screw element 68.

As discussed above, a clutch mechanism is incorporated in the damper 8. This may be desirable in certain embodiments as it will allow for "autorigging" of the damper 8.

For example, were the damper 8 to be connected to the drive shaft 10 when the rotary damper element 54 was in the position shown in FIG. 3, and the drive motor 6 operated, if a clutch mechanism was not incorporated, damage may be caused to the damper 8 as the carrier 56 would not be able to move any further along the driving screw element 68, even though the carrier 56 continues to be rotated via the gearing 28. Damage may therefore be caused to the housing 24, the screw driving element 68, carrier 56 or input element 10.

With the clutch arrangement illustrated, however, should the carrier 56 reach its end position before the actuator 4 has completed its stroke, the claws 70 on the carrier 56 and claws 90 on the screw driving element head portion 74 will engage, transmitting a torque to the screw driving element head portion 74. When this torque exceeds a predetermined figure, the detent balls 80 will, as discussed earlier, be forced into their bores 82, allowing the screw driving element 68 to rotate with the carrier 56. The rotation will stop when the actuator 4 reaches its own stop, at which point the balls 80 will re-engage in the housing splines 86, meaning that when the end stops of both the damper 8 and actuator 4 are synchronised or rigged.

Similarly, when the carrier 56 moves to the end position shown in FIG. 2, the claws 72 on the carrier 56 and claws 94 on the screw driving element 68 will inter-engage, such that driving of the carrier 56 further to the left in the sense of FIG. 2 will also cause the clutch mechanism to disconnect as above. This therefore synchronises the end position of the damper with that of the damper 8.

While a clutch mechanism has been illustrated in this embodiment as positioned between the screw driving element 68 and the housing 24, a clutch could be incorporated in other locations. For example, a similar mechanism might be provided between the ring gear 34 of the reduction gearing 38 and the housing 28, or in some other position in the load path.

Figure 4:
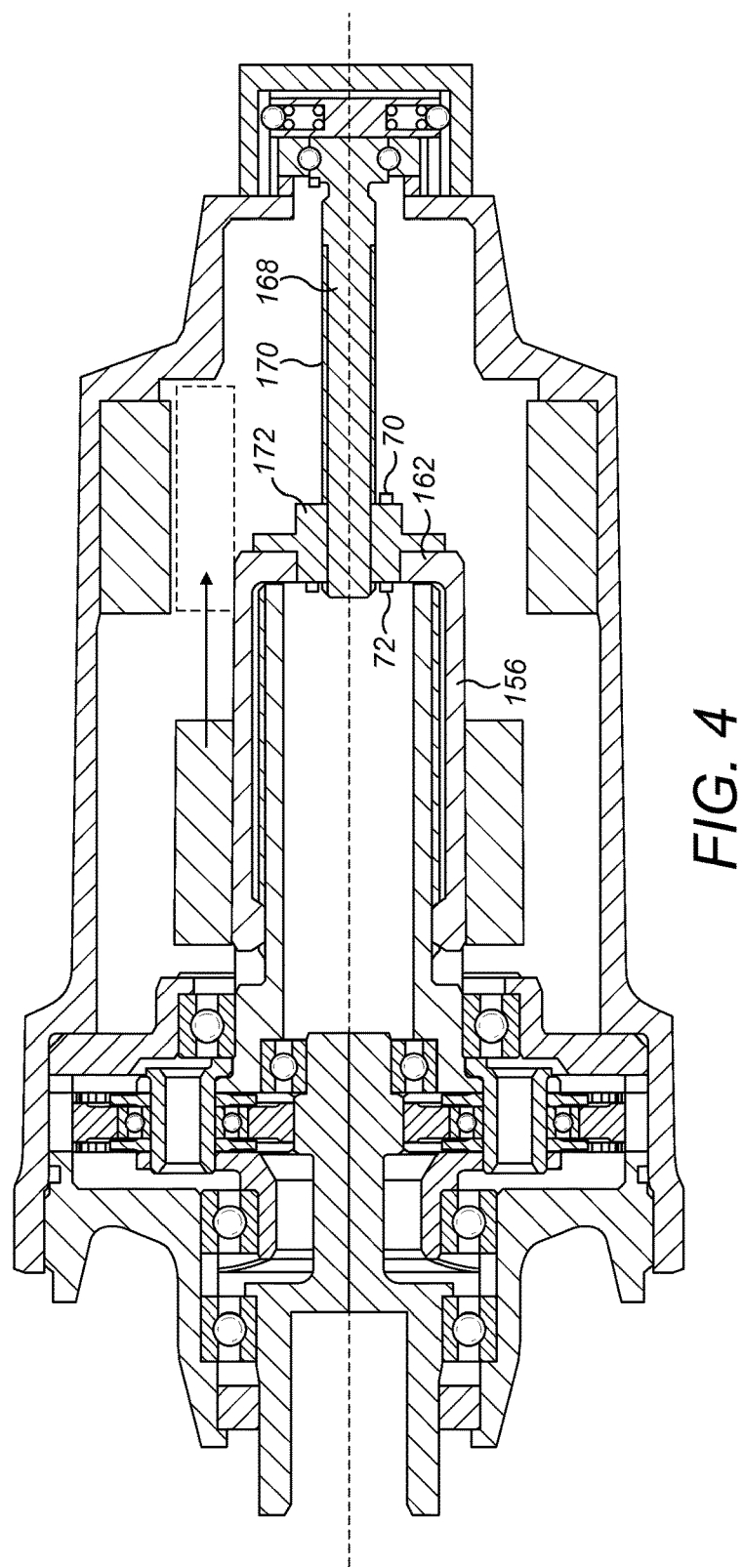
FIG. 4 shows an alternative embodiment of rotary magnetic damper.

Other modifications to the embodiment of FIGS. 2 and 3 may also be made. FIG. 4 shows such a modification.

In FIG. 4, the screw driving element 68 is formed as a ball screw 168 having a screw form ball track 170 on its external surface. A ball nut 172 is secured to the closed end 162 of the carrier 156 so as to rotate therewith. Balls are retained in a suitable manner between the nut 172 and track 170. The claws 70, 72 previously provided on the carrier 56 are now provided on the ball nut 172. The ball screw 168 may have an appropriately fine pitch, as required and may provide for less friction within the damper 8. The other features of the damper 8 are the same as those of the earlier embodiment.

The damper 8 has been illustrated above as being a stand-alone unit which is connectable to an actuator 4 by an appropriate coupling, for example the drive shaft 10. However, it would be equally possible to integrate the damper 8 within the actuator 4.

Also, while the damper 8 has been described as being used in actuators 4 used in aircraft, for example for moving flight control surface, undercarriage or thrust reverser components, it is not limited to such. The damper 8 may be used in any situation where a variable damping force is required.

Moreover, while the damper has been described in the context of providing damping of kinetic energy in a runaway or failure situation, it can be used in any situation where progressive damping is required, for example as a function of position or displacement of an actuator or other element.

Also, while the rotary damper element 54 has been described as being magnetic and the static damper element 96 as being electrically conductive, the elements may be reversed, with the static element 96 being magnetic.

Also, while the embodiment above illustrates the rotary element 54 as translating relative to the static element 96, in an alternative embodiment, the static element 96 may be configured to translate relative to the rotary element 54. In such an embodiment, the drive shaft 10 may be coupled to the rotary element such that it remains in the same axial position, and also coupled to the static element such that it translates axially.

It will be seen from the above, there has been described a rotary magnetic damper which allows a damping force to be phased in an advantageous manner with the stroke of an electrically powered actuator such that the electric motor of the system is not subjected to drag forces during acceleration of the actuator, but which at the same time allows runaway of the actuator to be managed by the progressive application of a damping force.

The embodiments above are thereby exemplary and other variations and modifications may be made thereto without departing from the scope of the disclosure.

The invention claimed is:

1. A rotary magnetic damper comprising:
   first and second damper elements which are rotatable relative to each other, and a rotary input coupled to one or both of the damper elements for rotating said one or both of the damper elements,
   wherein at least one of the damper elements is arranged such that rotation of the rotary input moves the at least one of the damper elements to translate towards and away from the other of the damper elements thereby to progressively magnetically engage the other of the damper element to progressively increase a damping force created by the damper;
   wherein the first and second damper elements comprise a rotary damper element and a static damper element; and
   wherein the rotary damper element is mounted such that rotation of the rotary input causes the rotary damper element to rotate, the rotational movement of the rotary damping element effecting the translational movement of the rotary damping element progressively magnetically engage the static damper element.

2. A damper as claimed in claim 1, wherein the rotary damper element is coupled to a static screw driving element.

3. A damper as claimed in claim 2, wherein the static screw driving element is a threaded drive screw.

4. A damper as claimed in claim 2, wherein the static screw driving element is a ball screw.

5. A damper as claimed in claim 1, wherein the rotary damper element is mounted to a splined output element of the rotary input so as to be translatable along the splined output element.

6. A damper as claimed in claim 1, wherein the rotary damper element is mounted on a carrier, the carrier engaging the rotary input and the screw driving element.

7. A damper as claimed in claim 6, wherein the carrier is cup-shaped having a base and an annular wall upstanding therefrom, with a closed end of the carrier engaging the screw driving element.

8. A damper as claimed in claim 1, wherein the rotary input comprises reduction gearing to reduce the rotational speed of the rotary damper element relative to the speed received by the rotary input.

9. A damper as claimed in claim 8, wherein the reduction gearing is a planetary gearing system.

10. A damper as claimed in claim 1, further comprising a clutch configured to prevent translational movement of the rotary damper element beyond a predetermined end position.

11. A damper as claimed in claim 10, wherein the screw driving element is provided with a clutch configured to prevent translational movement of the rotary damper element beyond the predetermined end position.

12. A damper as claimed in claim 11, wherein the clutch is a ball detent clutch.

13. A damper as claimed in claim 10, wherein the clutch is provided in the reduction gearing and configured to prevent translational movement of the rotary damper element beyond the predetermined end position.

14. A damper as claimed in claim 1, wherein the rotary damper element comprises one or more magnetic elements arranged around an axis in a circumferential manner, and the static damper element comprises a ring of electrically conductive material.

15. A damper as claimed in claim 1, wherein the damper damps said rotary input to the damper.

16. An actuator system comprising an electric drive motor, an actuator coupled to the electric drive motor and a rotary magnetic damper as claimed in claim 1, rotationally coupled to the actuator.

17. An actuator system as claimed in claim 16, wherein an initial position of the rotary damper element relative to the static damper element is chosen such that as the actuator accelerates from rest to an operative speed, the magnetic interaction between the rotary and static damper elements is insignificant, with a significant damping force only being generated by the damper over a predetermined proportion of the length of the actuator stroke.

18. An actuator system as claimed in claim 16, wherein the actuator is a screw actuator or a ball screw actuator.

* * * * *